(12) United States Patent
Anderson

(10) Patent No.: US 6,767,001 B2
(45) Date of Patent: Jul. 27, 2004

(54) ADJUSTABLE MANIFOLD JOINING SYSTEM

(75) Inventor: Richard C. Anderson, Hartsville, SC (US)

(73) Assignee: Anderson Brass Company, Hartsville, SC (US)

(*) Notice: Subject to any disclaimer, the term of this patent is extended or adjusted under 35 U.S.C. 154(b) by 105 days.

(21) Appl. No.: 10/189,334

(22) Filed: Jul. 2, 2002

(65) Prior Publication Data
US 2004/0003852 A1 Jan. 8, 2004

(51) Int. Cl.[7] .................................................. F16L 5/00
(52) U.S. Cl. ............... 251/148; 285/133.21; 285/133.4; 285/89
(58) Field of Search ..................... 251/148; 285/133.21, 285/133.4, 89, 302

(56) References Cited

U.S. PATENT DOCUMENTS

| | | | |
|---|---|---|---|
| 652,474 A | 6/1900 | Cook | |
| ,904,673 A | * 11/1908 | Bideker | 285/332.3 |
| 1,315,054 A | 9/1919 | Teisseire | |
| 1,333,826 A | 3/1920 | Yeiser et al. | |
| 1,667,141 A | 4/1928 | Crowley | |
| 1,832,723 A | 11/1931 | Mueller | |
| 2,497,986 A | * 2/1950 | Goode | 285/89 |
| 2,850,299 A | * 9/1958 | Risley | 285/133.21 |
| 2,960,353 A | * 11/1960 | Woodling | 285/212 |
| 4,083,410 A | * 4/1978 | Anderson | 169/37 |
| 4,469,122 A | * 9/1984 | Meek | 137/312 |
| 5,056,831 A | * 10/1991 | Ho | 285/93 |
| 5,404,905 A | 4/1995 | Lauria | |
| 5,419,363 A | 5/1995 | Robinson | |
| 5,566,708 A | 10/1996 | Hobbs, Jr. | |
| 5,921,580 A | * 7/1999 | Dyer | 283/32 |
| 6,116,437 A | * 9/2000 | Rowe | 211/189 |

* cited by examiner

Primary Examiner—John Fox
(74) Attorney, Agent, or Firm—Dority & Manning, P.A.

(57) ABSTRACT

A manifold joining system is provided that allows for adjustment of the relative lineal and angular position of the manifold while still maintaining a fluid seal at the points of connection. The joining system may include elements for securing the relative lineal and angular position of the manifold upon positioning the connection of the manifold as desired.

9 Claims, 5 Drawing Sheets

ADJUSTABLE MANIFOLD JOINING SYSTEM

FIELD OF THE INVENTION

The present invention relates to a manifold joining system. More specifically, the present invention provides a system for joining a manifold together in a manner that allows for lineal and angular adjustment while providing a sealing connection of the manifold.

BACKGROUND OF THE INVENTION

Many industrial processes require fluid transport and control. Associated instrumentation and hardware frequently require intricate valving, piping, and instrumentation. In some applications, controls and other instrumentation may be mounted upon or within a panel for the purposes of providing ready access and identification to an operator.

Commonly, a control or instrumentation panel will be provided with preconfigured holes or mounts for locating of valves, meters, controls and the like. As a result, during the installation or repair of the manifold associated with a particular panel, valves, controls, piping, and other items must be installed into the panel in a preset configuration as required for a particular panel. For example, where a manifold requires multiple valves, predrilled holes or other mounts provided with the panel may dictate the distance between the valves and their relative angular relationship. As a result, installation and repair of such a manifold may require matching of multiple fittings and/or cut to length tubing or piping in an effort to properly mount and position the valves or other controls within the panel. Such an endeavor can consume valuable time and materials.

Accordingly, a joining system that would allow for adjustment of the relative lineal and angular positions of a manifold while providing fluid sealing connections would be useful and beneficial in terms of materials and labor.

SUMMARY OF THE INVENTION

Objects and advantages of the invention will be set forth in part in the following description, or may be obvious from the description, or may be learned through practice of the invention.

The present invention provides a system for joining a manifold or piping system. More specifically, the present invention allows for joining a piping system in a manner that allows for adjustment of the relative lineal and angular position of the manifold while still maintaining a fluid seal at the points of connection.

In one exemplary embodiment of the present invention, a manifold joining system is provided that includes a fitting that has at least two connecting ends. Each connecting end of the fitting defines an opening to an internal fluid passageway formed by the fitting. Each connecting end includes an external surface that defines a series of threads for connecting the fitting to a manifold. The external surface located on each connecting end also defines a groove for the receipt of a sealing element. The groove is located between the opening and the series of threads on each connecting end. A pair of sealing elements is included—one each being located in the groove of each connecting end. A pair of threaded locking elements are provided. One locking element is located on each connecting end and is operated over the series of threads. The locking element operates to secure the relative lineal and angular position of a manifold being joined. The external surface may also define an extension located between the groove and the series of threads. The length of the extension helps to determine the degree of lineal adjustment of the manifold joining system. The fitting may further include an additional connecting end defining yet an additional opening to the internal fluid passageway. This exemplary embodiment may also include a valve connected to one of the connecting ends. The valve is configured for receipt of the connecting end and has a sealing surface for providing a fluid seal with one of the sealing elements. The sealing element may be comprised of an o-ring; although it should be understood using teachings disclosed herein the variety of sealing elements of various configurations and materials of construction may be utilized.

In another exemplary embodiment of the present invention, a manifold joining system is provided that includes a connecting element that has a first opening and a second opening. Each such opening is configured for being matingly connected to a manifold. First and second locking elements are configured with the first and second openings so as to allow the lineal and radial positions of the manifold relative to the fitting to be fixed. First and second sealing elements are provided, each being located between the first and second locking elements and the first and second openings respectively. Each sealing element is configured for allowing the fitting to be resealably connected to the manifold. An annular recess may be provided between each locking element and each opening. The annular recess is configured for receipt of the sealing element. The connecting element may define a series of threads, located approximate to each opening, and configured for receiving the first and second locking elements. The locking elements may be spaced apart from the sealing elements by a predetermined distance that determines the degree of linear and angular adjustability of this embodiment of the present invention. Furthermore, this embodiment may include a valve connected to the first opening. Such valve is configured to provide a sealing surface for contact with the first sealing element.

In still another exemplary embodiment of the present invention, a lineally and radially adjustable fitting for a piping system is provided. This embodiment includes a connector that forms a fluid passageway between first, second, and third ports. The connector also defines a series of threads located externally upon each of said first, second and third ports. Locking elements are located on the series of threads of the first and second ports. The locking elements are configured for resealably securing the relative lineal position and radial orientation of the piping system relative to the connector. First and second sealing elements are located proximate to the first and second ports and operate to provide a fluid seal when the connector is attached to a piping system. The connector of this exemplary embodiment of the present invention may further define an extending surface between the first sealing element and the series of threads for the first port. A recess may be located proximate to the first port and configured for receipt of a sealing element. This embodiment of the present invention may further include a valve, connected to the first port of the connector. The valve may be configured to receive the first port and provide a sealing surface for mating receipt of the first sealing element.

In another exemplary embodiment of the present invention, a manifold joining system is provided that includes a cylindrical shaped fitting that defines an internal fluid conduit that extends through the length of the cylindrical fitting between at least two openings located on the fitting. The cylindrically shaped fittings define a pair of threaded male connectors configured for connecting the fitting to a manifold. Sealing rings are located on each threaded male connector in a spaced relationship from the threads. One sealing ring is located proximate to each of the two openings. This embodiment may further include a valve connected to at least one of the threaded male connectors. The valve defines an internal surface configured for contacting at least one of the sealing rings so as to provide a fluid seal for the connection.

While the exemplary embodiments of the present invention have been discussed using the connection of valves as an example, it should be understood that the present invention is not limited to the use of valves and instead may be used to connect a manifold having various types of controls or other instrumentation as may be needed for a particular process. Furthermore, the present invention is not limited to any particular materials of construction as will be understood by one of skill in the art using the teachings disclosed herein.

These and other features, aspects and advantages of the present invention will become better understood with reference to the following description and appended claims. Accompanying drawings, which are incorporated in and constitute a part of this specification, illustrate an embodiment of the invention and, together with the description, serve to explain the principles of the invention.

DETAILED DESCRIPTION OF THE INVENTION

Figure 1:
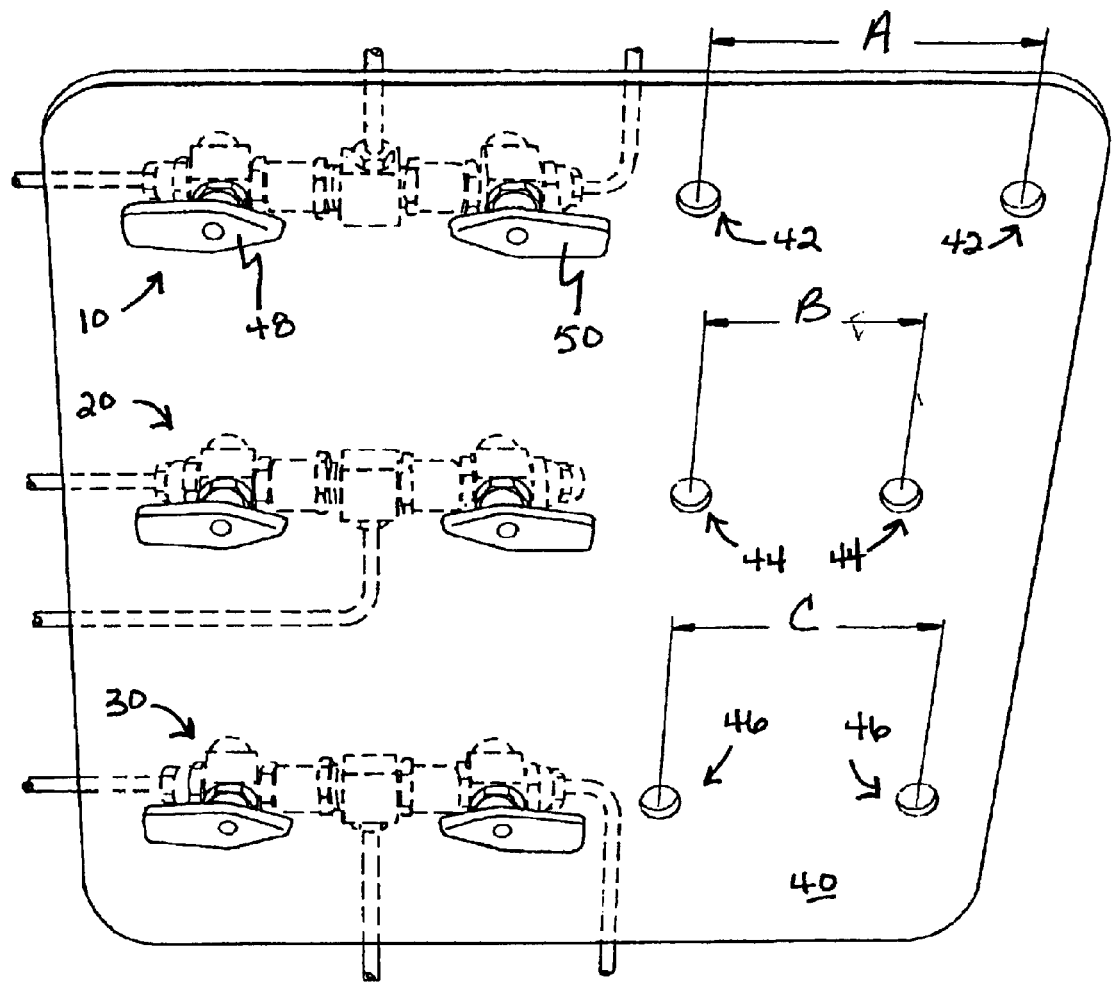
FIG. 1 illustrates exemplary embodiments of the present invention as might be mounted upon an instrumentation panel.

Reference will now be made in detail to the embodiments of the invention, one or more examples of which are set forth in the drawings. Each example is provided by way of explanation of the invention and not as a limitation of the invention. For example, features illustrated or described as part of one embodiment may be used with another embodiment to yield still a further embodiment. In fact, it will be apparent to those skilled in the art that various modifications and variations can be made to the present invention without departing from the scope or spirit of the invention.

Referring now to FIG. 1, exemplary embodiments of a manifold joining system 10, 20, and 30 are shown attached or connected to an instrumentation panel 40. Shown in phantom lines are those portions that would be hidden behind the panel. Such a panel might be present, for example, in the control room of a chemical production facility. This panel might be mounted upon a wall or within a console as part of an overall control system. It should be understood, however, that the present invention is not limited to use with a console or panel. Also, as used herein, the term manifold is used simply to describe a piping system and its components. The present invention is not limited to use with any particular fluid; liquids and gases of any composition may be used with the present invention as will be understood by one of skill in the art using the teachings disclosed herein.

Instrumentation panel 40 is also depicted with three pairs of openings 42, 44, and 46. The distance separating each pair of openings varies and is designated by lengths A, B, and C. Accordingly, to install valves, controls, or other items into a manifold behind instrumentation panel 40, one must match the varying distances represented by lengths A, B, and C. While matching these lengths can be accomplished by carefully selecting fittings and/or cut to length piping or tubing, the present invention allows for lineal and angular adjustment of the distance between items to be mounted in pairs of holes 42, 44, and 46 without the necessity of multiple additional fittings and/or cut to length piping or tubing for the purposes of matching lengths A, B, and C.

For purposes of illustration, exemplary embodiments 10, 20, and 30 are shown with a pair of valves. For example, exemplary embodiment of the manifold joining system 10 is shown with valve 48 and 50 mounted upon instrumentation panel 40. It should be understood, however, that the present invention is not limited to use with valves. Instead, the present invention provides a manifold joining system that may be used with a variety of controls and instrumentation as may be necessary to mount upon an instrumentation panel or otherwise.

Figure 2:
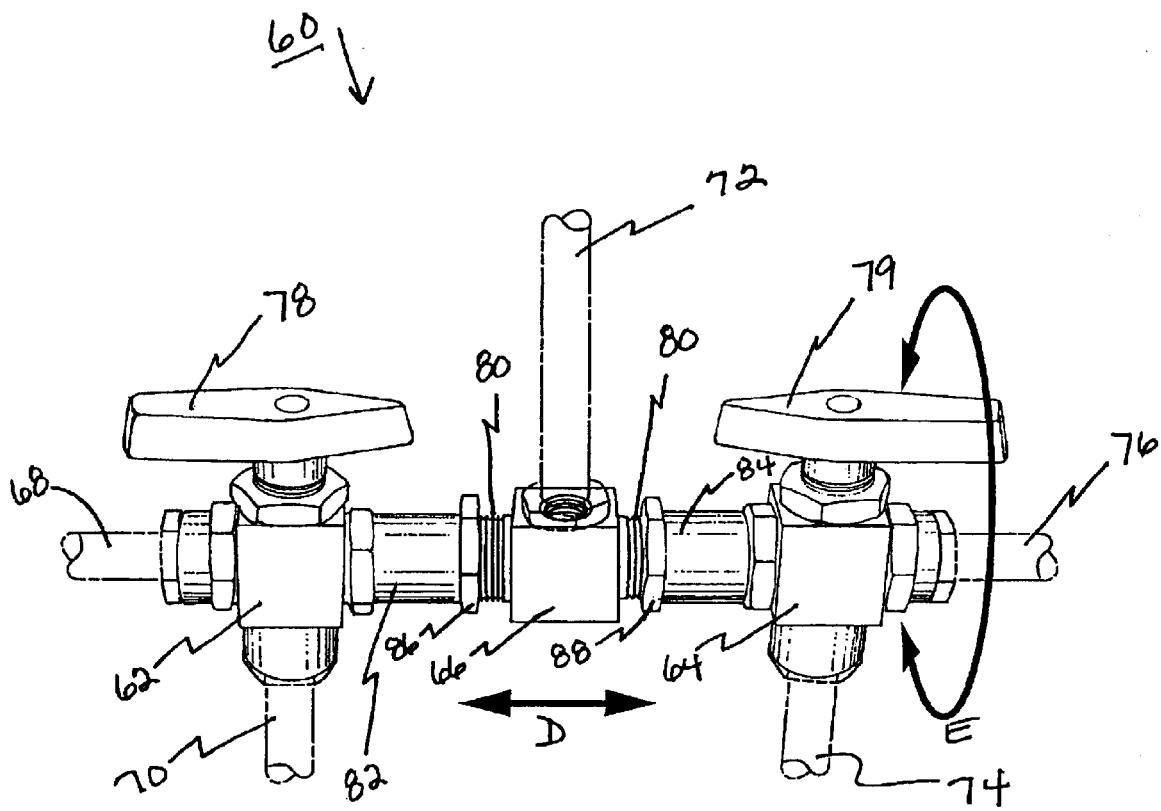
FIGS. 2 and 3 illustrate an exemplary embodiment of the present invention with directional arrows indicating lineal and angular adjustability.

FIG. 2 shows another exemplary embodiment of a manifold joining system 60. For purposes of discussion, no instrumentation panel or control panel is depicted. Three way valves 62 and 64 are shown attached by a connecting element or fitting 66. The manifold depicted in FIG. 2 includes piping or tubing 68, 70, 72, 74, and 76. No directions are shown for fluid to flow through these various elements of tubing because multiple directions may be utilized as desired for particular application or process. By way of example only, by actuation of handle 78, three-way valve 62 may be used to allow fluid communication between tubing 68 and 70 or between tubing 68 and fitting 66. Furthermore, the present invention is not limited to use with three-way valve such as 62 and 64; two-way valves as well as other controls and instrumentation may be utilized. In addition, fitting 66 need not include an opening for tubing 62, as will be described and discussed in connection with the exemplary embodiment depicted in FIG. 4.

Fitting 66 is connected to three-way valve 62 and 64 using a series of threads 80. Valves 62 and 64 each include a port connection 82 and 84 respectively, each being configured for mating receipt of the series of threads 80. Locking elements or nuts 86 and 88 operate over the series of threads 80 to secure the connection of fitting 66 to valves 62 and 64 respectively. By way of example, nut 86 operates across the series of threads 80 to apply torque against port of connection 82. Accordingly, nut 86 allows both the lineal and angular position of valve 62 relative to fitting 66 and/or valve 64 to be secured.

Arrow D symbolically represents an adjustment feature of the exemplary manifold joining system 60. For example, by choosing the number of turns by which to screw valve 62 and 64 onto series of threads 80, the relative distance between valves 62 and 64 can be adjusted. The range of adjustability is determined in part by the length of series of threads 80 and the length of port of connections 82 and 84 as will be discussed in more detail below. Once the desired distance D has been determined, nuts 86 and 88 can be used to lock or secure relative to this position.

Figure 3:
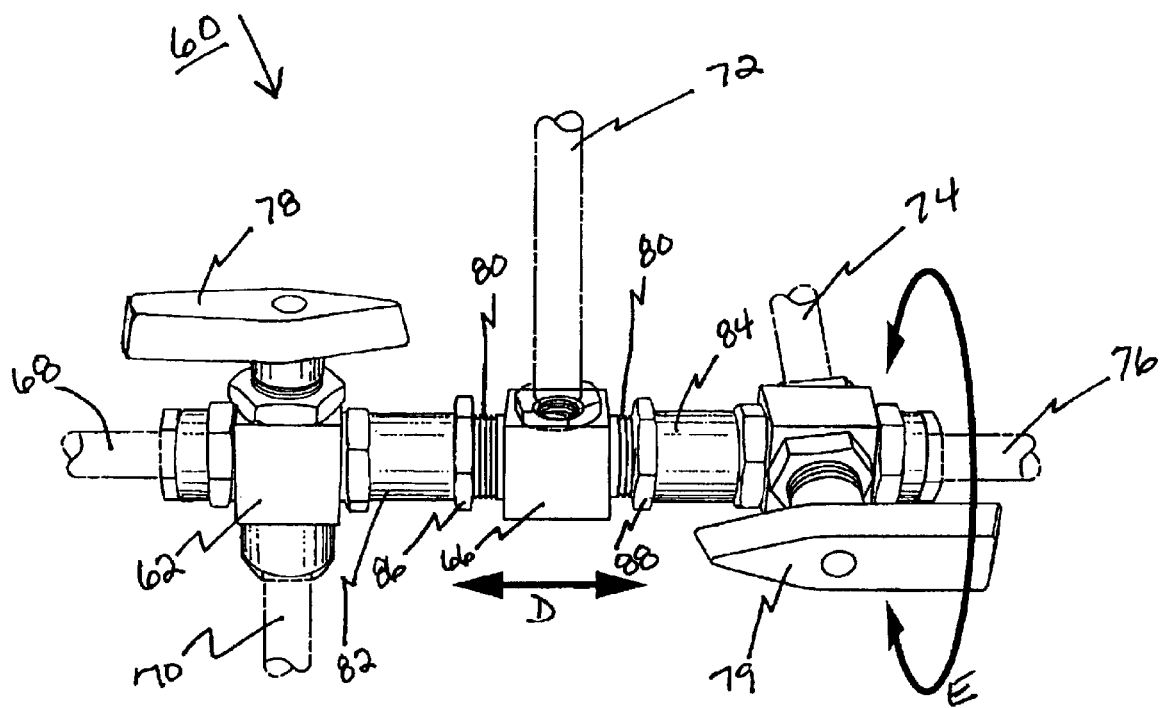

Referring to FIGS. 2 and 3, in similar fashion Arrow E indicates that the relative angular position of valve 64 and 62 may be adjusted. For example, by fixing the position at which valve 64 is screwed or threaded onto series of threads 80, the relative angle between valve 62 and 64 can be determined. By way of example only, FIG. 3 shows valve 64 rotated 90 degrees from the position depicted for valve 64 in FIG. 2. Again, once the relative angular position of valve 64 (or 62) have been determined, locking nuts 86 and 88 may be operated over a series of threads 80 to apply torque against port of connections 82 and 84, thereby securing the relative positions of valve 62 and 64.

Figure 4:
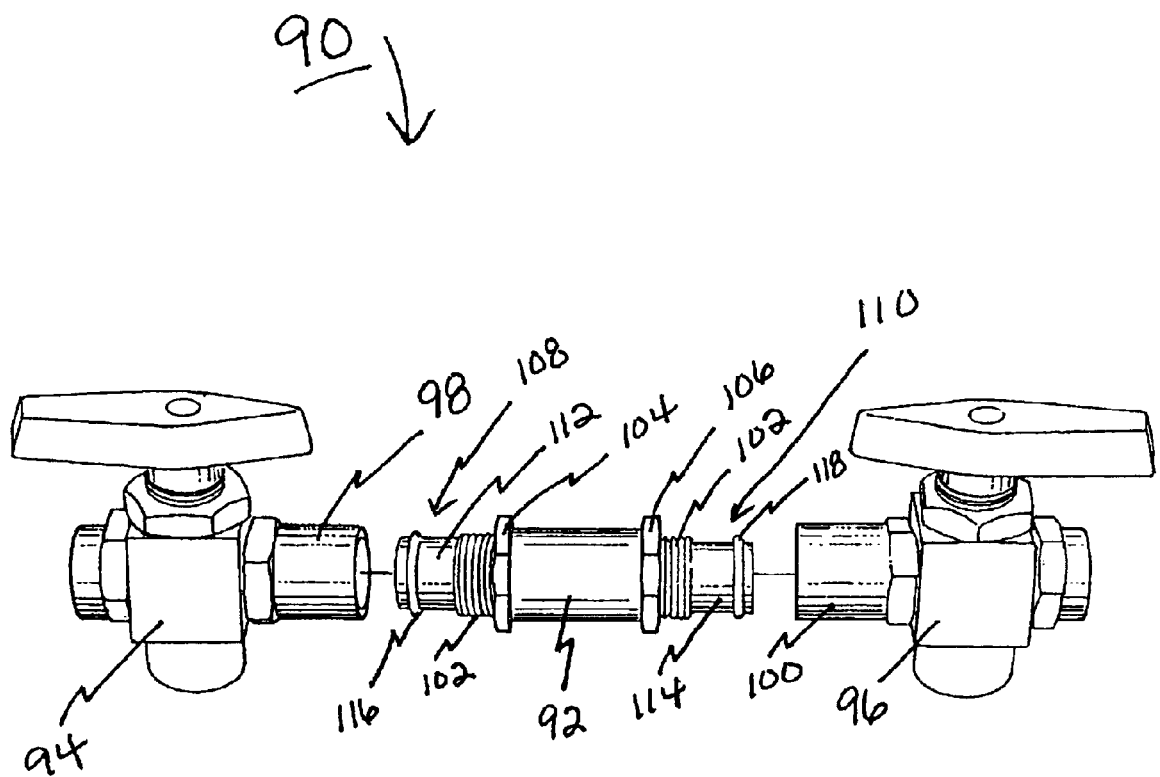
FIG. 4 illustrates another exemplary embodiment of the present invention in exploded form.

FIG. 4 depicts another exemplary embodiment of a manifold joining system 90 in exploded format. A connecting 92 is used to connect three way valves 94 and 96. Each valve 94 and 96 includes a port of connection 98 and 100 respectively. Connector 92 defines a series of threads 102 over which locking elements 104 and 106 are operative. Series of threads 102 is located upon each connecting end 108 and 110 of connector 92. Connector 92 defines an internal fluid passageway spanning between openings located at each of connecting ends 108 and 110.

Each connecting end 108 and 110 is defined in part by an external surface that defines series of threads 102 and extensions 112 and 114. O-rings or seating elements 116 and 118 are located approximate to the open end of connecting ends 108 and 110. Sealing elements 116 and 118 may be secured in a groove or other recess defined by external surface of connecting ends 108 and 110.

Accordingly, in a fashion similar to that described with FIGS. 2 and 3, the exemplary manifold joining system 90 may be used to adjust the relative lineal and angular position of valves 94 and 96. Such is accomplished by attaching three-way valve 94 and 96 to connecting ends 108 and 110 and securing each into the position desired. Mores specifically, through a valve 94 is attached to connecting end 108 by rotating valve 94 onto a series of threads 102, the lineal and angular position of valve 94 relative to connector 92 and/or valve 96 may be determined. Once the desired position of valve 94 is obtained, locking element 104 may be used to affix the position of valve 94. Furthermore, sealing element 116 helps to ensure that the resulting connection between valve 94 and connector 92 does not leak the fluid being transported and controlled. In a similar fashion, the relative lineal end angular position of valve 96 with respect to connector 92 and/or valve 94 may be determined.

Continuing to refer to FIG. 4, the amount of adjustability achievable with the exemplary embodiment 90 is determined by the manufacture of various components. By way of example, by extending the length of extension 112, a series of threads 102, and port of connection 98, the amount of linear adjustment available for the connection between valve 94 and 92 may be determined. In similar fashion, by determining the length of extension 114 of connecting end 110 and the length of the port of connection 100, the degree of linear adjustment available for the connection between valve 96 and fitting 92 is determined.

Figure 5:
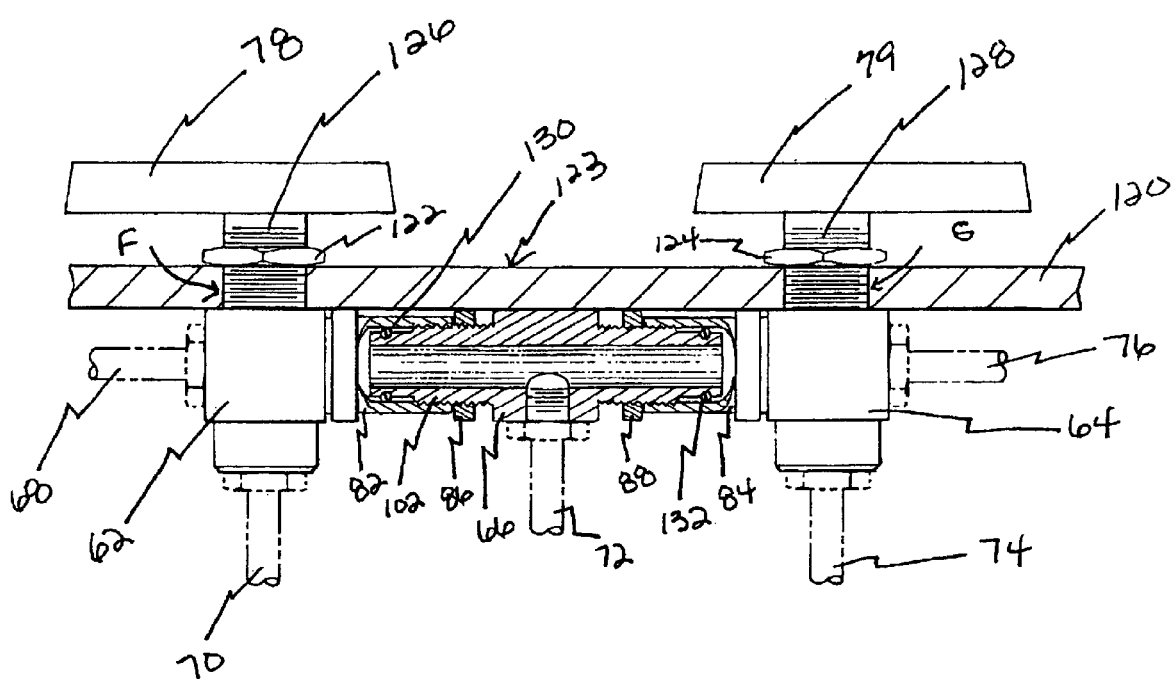
FIG. 5 provides a partial cross sectional view of an exemplary embodiment of the present invention as may be mounted upon a panel.

FIG. 5 illustrates a connection of exemplary embodiment discussed with regard to FIGS. 2 and 3 connected to a panel 120. Lock nuts 122 and 124 may be used to secure the position of manifold 2 to panel 120. Accordingly, an operator has ready access to the handles 78 and 79 of valves 62 and 64; however, the manifold remains hidden behind panel 120. Panel surface 122 of panel 120 may be provided with labels and various other instructions for identifying valve 62 and 64 and/or their operation.

Panel 120 contains openings F and G through which valve stems 126 and 128 extend. The adjustability provided by the present invention, allows the relative distance between and the angle between valve 62 and 64 to be adjusted. For example, the distance between valve 62 and 64 maybe adjusted to meet the distance between openings F and G in panel 120. Furthermore, although not depicted in FIG. 5, if opening G was in a different plane than opening F, relative angle between valve 64 and 62 could be adjusted using the manifold joining system 90.

Using the connection of valve 62 as an example, as port end 82 is connected onto series of threads 102, sealing element 130 moves within port of connection 82 to provide a fluid seal for this connection. Once the position of valve 62 has been set, locking element 86 can be used to secure the valve's relative position to the rest of the manifold. In similar fashion, sealing element 132 provides a fluid seal for the connection of valve 64 and fitting 66. If desired, a thread sealant may be used with series of threads 102 to provide redundancy in sealing and to also assist with securing the final relative position of valves 62 and 64 and fitting 66.

It should be appreciated by those skilled in the art that modifications and variations can be made to the manifold joining system as described herein, without departing from the scope and spirit of the claims. It is intended that the invention include such modifications and variations as come within the scope of the appended claims and their equivalents.

What is claimed is:

1. A manifold joining system, comprising:
   a fitting having at least two connecting ends, each said connecting end defining an opening to an internal fluid passageway formed by said fitting;
   wherein each said connecting end includes an external surface that defines a series of threads for connection to a manifold, each said external surface also defining a groove for the receipt of a sealing element, said groove being located between said opening and said series of threads;
   a pair of sealing elements, one each located within each said groove; and
   a pair of threaded locking elements, one each operative over said series of threads, for securing the relative lineal and angular position of the manifold.

2. A manifold joining system as in claim 1, wherein each said external surface further defines an extension located between each said groove and each said series of threads.

3. A manifold joining system as in claim 1, wherein said fitting further comprises an additional connecting end that defines an additional opening to said internal fluid passageway.

4. A manifold joining system as in claim 1, further comprising a valve connected to one of said two connecting ends, said valve being configured for receipt of said connecting end and having a sealing surface for providing a fluid seal with one of said sealing elements.

5. A manifold joining system as in claim 2, 3, or 4 wherein said pair of sealing elements are comprised of o-rings.

6. A manifold joining system, comprising:
   a connecting element having a first opening and a second opening, wherein said first and second openings are each configured for being matingly connected to a manifold;
   first and second locking elements configured with said first and second openings such that the lineal and radial positions of the manifold relative to said fitting may be fixed;

a first and second sealing element, located between said first and second locking elements and said first and second openings respectively, and configured for allowing said fitting to be resealably connected to the manifold; and a valve connected to said first opening, said valve configured to provide a sealing surface for contact with said first sealing element.

7. A lineally and radially adjustable fitting for a piping system, comprising:

a connector forming fluid passageway between first, second, and third ports, said connector also defining a series of threads located upon each of said first and second ports;

locking elements located on each of said series of threads of said first and second ports and configured for releasably securing the relative lineal position and radial orientation of the piping system relative to said connector;

first and second sealling elements located proximate said threaded first and second ports for providing a fluid seal when said connector is attached to the piping system; and a valve, connected to said first port of said connector, said valve being configured to receive said first port and provide a sealing surface for mating receipt of said first sealing element.

8. A manifold joining system, comprising:

a cylindrically shaped fitting defining an internal fluid conduit that extends through the length of said cylindrical fitting between at least two openings in said fitting, said cylindrically-shaped fitting defining a pair of threaded male connectors configured for connecting said fitting to a manifold; and Sealing rings, one each located in a spaced relationship from said threaded male connector, proximate to each of said at least two openings; and a valve connected to one of said pair of threaded male connectors, said valve having an internal surface configured for contacting at least one of said sealing rings to provide a fluid seal.

9. A manifold joining system as in claim 8, wherein said valve is a three-way valve.

* * * * *

UNITED STATES PATENT AND TRADEMARK OFFICE
CERTIFICATE OF CORRECTION

PATENT NO. : 6,767,001 B2  
APPLICATION NO. : 10/189334  
DATED : July 27, 2004  
INVENTOR(S) : Richard C. Anderson Page 1 of 1

It is certified that error appears in the above-identified patent and that said Letters Patent is hereby corrected as shown below:

On the title page item (75), should read: ROBERT C. ANDERSON  
Column 7 line 21 "sealling" should be --sealing--

Signed and Sealed this

Eighth Day of January, 2008

JON W. DUDAS  
*Director of the United States Patent and Trademark Office*